United States Patent [19]

Messner

[11] Patent Number: 5,026,336

[45] Date of Patent: Jun. 25, 1991

[54] APPARATUS FOR CONTROLLING THE FEED OF AN INTERMITTENT WEB FEEDING APPARATUS

[75] Inventor: Helmut Messner, Arbon, Switzerland

[73] Assignee: Bruderer AG, Frasnacht, Switzerland

[21] Appl. No.: 426,842

[22] Filed: Oct. 24, 1989

[30] Foreign Application Priority Data

Oct. 26, 1988 [CH] Switzerland .................. 3983/88

[51] Int. Cl.$^5$ .................. F16H 1/445; B65H 18/18
[52] U.S. Cl. ..................... 475/224; 475/243; 226/143; 226/154
[58] Field of Search ............ 475/223, 224, 243, 84; 226/142, 143, 154

[56] References Cited

U.S. PATENT DOCUMENTS

| | | | |
|---|---|---|---|
| 1,243,720 | 10/1917 | Edison et al. | 475/223 |
| 1,682,386 | 8/1928 | Lewis | 475/223 |
| 2,253,535 | 8/1941 | Weinig | 475/224 X |
| 3,758,011 | 9/1973 | Portmann | 226/142 |
| 3,784,075 | 1/1974 | Portmann | 226/143 |
| 4,188,838 | 2/1980 | Nakao et al. | 475/223 |
| 4,555,962 | 12/1985 | Bucarelli | 475/223 X |
| 4,601,217 | 7/1986 | Teraoka et al. | 475/243 X |

Primary Examiner—Allan D. Herrmann
Assistant Examiner—Khoi Q. Ta
Attorney, Agent, or Firm—Ladas & Parry

[57] ABSTRACT

The driving gear meshes with the gear on the web of a planetary gear. This planetary gear includes an arrestable sun wheel. The output sun wheel is rigidly connected to the drive shaft. It extends through a sleeve section of the web. A longitudinally displaceable shifting sleeve is located on the sleeve section, which shifting sleeve has a plurality of control disks. These control disks control via a roller the rocking movement of the upper feeding roller. Accordingly, the period of the rocking movement can be selected depending on a respective selected control disk.

If the sun wheel is unlocked, the shifting sleeve may be moved such that it engages directly the drive shaft such that by properly selecting the number of teeth, it is possible to choose between a rotational speed transmission relation of 1:2 and 1:1.

5 Claims, 4 Drawing Sheets

APPARATUS FOR CONTROLLING THE FEED OF AN INTERMITTENT WEB FEEDING APPARATUS

BACKGROUND OF THE INVENTION

1. FIELD OF THE INVENTION

The present invention relates to an apparatus for controlling the feed of a feeding apparatus for the intermittent feeding of a web-shaped workpiece.

2. DESCRIPTION OF THE PRIOR ART

An apparatus for the intermittent feeding of a workpiece is disclosed in the U.S. Pat. No. 3,758,011 and in the U.S. Pat. No. 3,784,075. In these apparatuses, a selected and predetermined relationship between the rotational speed of the driving shaft and the phase of the oscillation is present. These known apparatuses do not allow a changing of this relationship after it has been initially set or then such changes or adjustments can be made by large expenditures only.

SUMMARY OF THE INVENTION

It is thus a general object of the present invention to provide an apparatus, by means of which the stroke of the feed can be adjusted directly.

A further object of the present invention is to provide such an apparatus which comprises a planetary gear having a web including a toothed rim which meshes with a driving gear wheel, which web supports planet pinions, which mesh on the one hand with an arrestable sun wheel and on the other hand with an output sun wheel seated on a shaft which is rotatably supported in an axial sleeve section of said web and coupled to an eccentric member of a transmitting unit operative to transform the rotational movement of the shaft of the output sun wheel into an oscillating movement for a driving of said feeding apparatus.

BRIEF DESCRIPTION OF THE DRAWINGS

The present invention will be better understood and objects other than those set forth above will become apparent when consideration is given to the following detailed description thereof. Such description makes reference to the annexed drawings, wherein.

DESCRIPTION OF A PREFERRED EMBODIMENT

Figure 1:
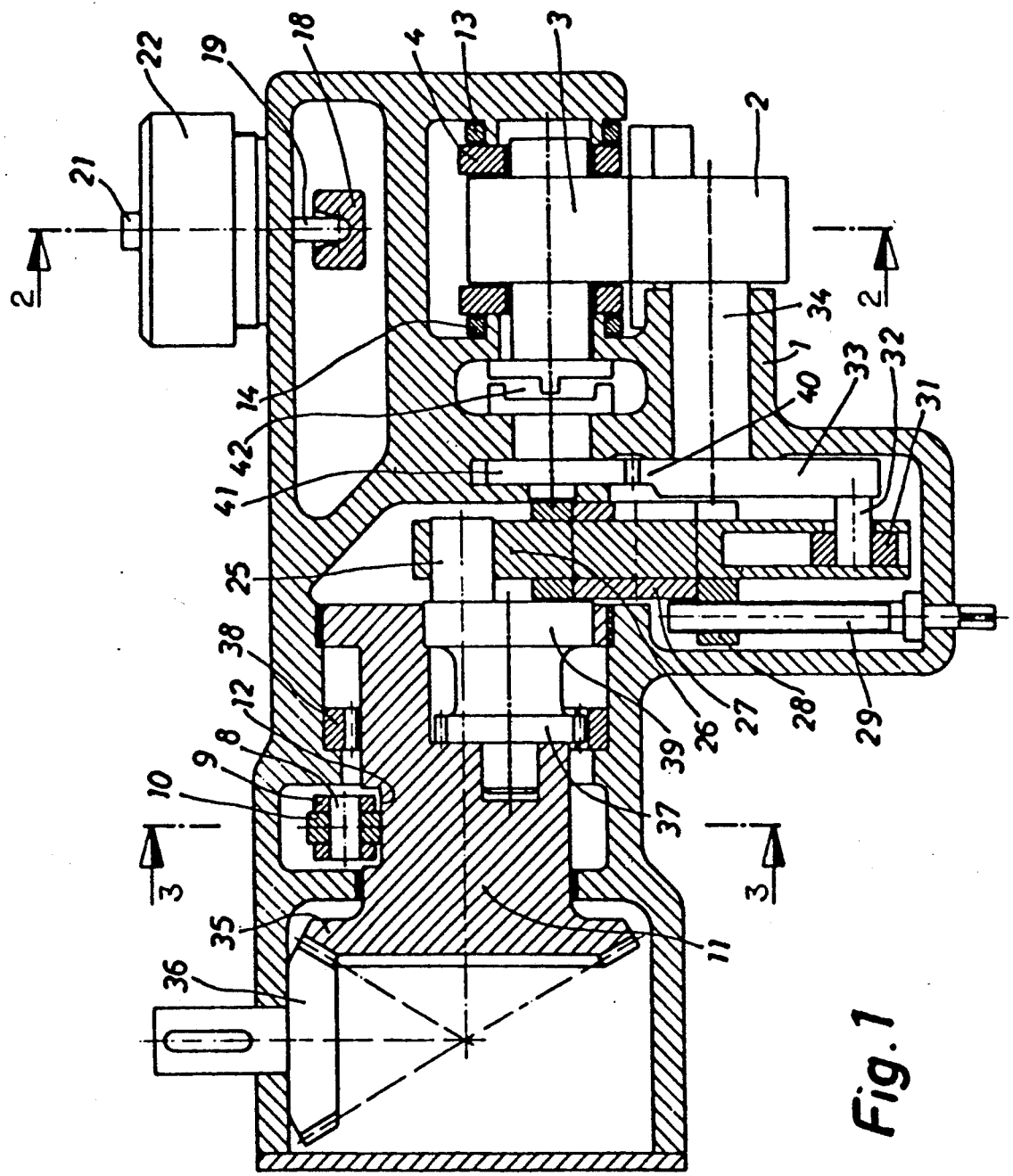
FIG. 1 is a sectional view of a first embodiment of a feeding apparatus.

The apparatus for the intermittent feeding of web-shaped workpieces, for instance, sheet metal webs includes a casing 1. An oscillating feeding unit 2 is supported in this casing 1. In the embodiment illustrated in FIGS. 1 and 2 this feeding unit 2 is a lower feeding roller. Furthermore, an adjustably supported pressing, or upper feeding, roller 3 is located adjacent the oscillating feeding unit 2, i.e. adjacent the lower feeding roller. The two feeding rollers 2 and 3 of this embodiment are driven to rotate in an opposite sense relative to each other by structures explained in detail further below. The upper feeding roller 3 is supported rotatably at both its ends in a rocker 4, which rocker 4 is supported at both sides of the upper feeding roller 3 via one respective spring 5 and 6, respectively, on the casing 1. At the end of the rocker 4 which is supported on the spring 5 the rocker 4 is hingedly mounted via a link member (a rod) 7, a shaft 8 to a lever 9, which lever carries at its free end a rotatably supported roller 10. This roller 10 cooperates with a cam member 12 located on a drive shaft 11. The drive of this drive shaft 11 is coupled to the drive of the two feeding rollers 2 and 3 and will be explained in detail further below. A pair of arms 13, 14 are hingedly mounted to the rocker 4, which arms are hingedly mounted at their opposite ends to the casing 1. A pressing bar 46 is inserted between the two arms of this pair of arms 13, 14.

The rocker 4 comprises at its end which is supported on the spring 6, a pin 15 which is received in an oblong hole 16 of a supporting member 17. This supporting member 17 is pivotably mounted to a double lever 18, which is acted upon by the piston rod 19 of a piston 20. A pin 21 is, furthermore, mounted to piston 20, which pin 21 cooperates with an adjusting nut 22 which engages threadingly the casing 1.

Figure 5:
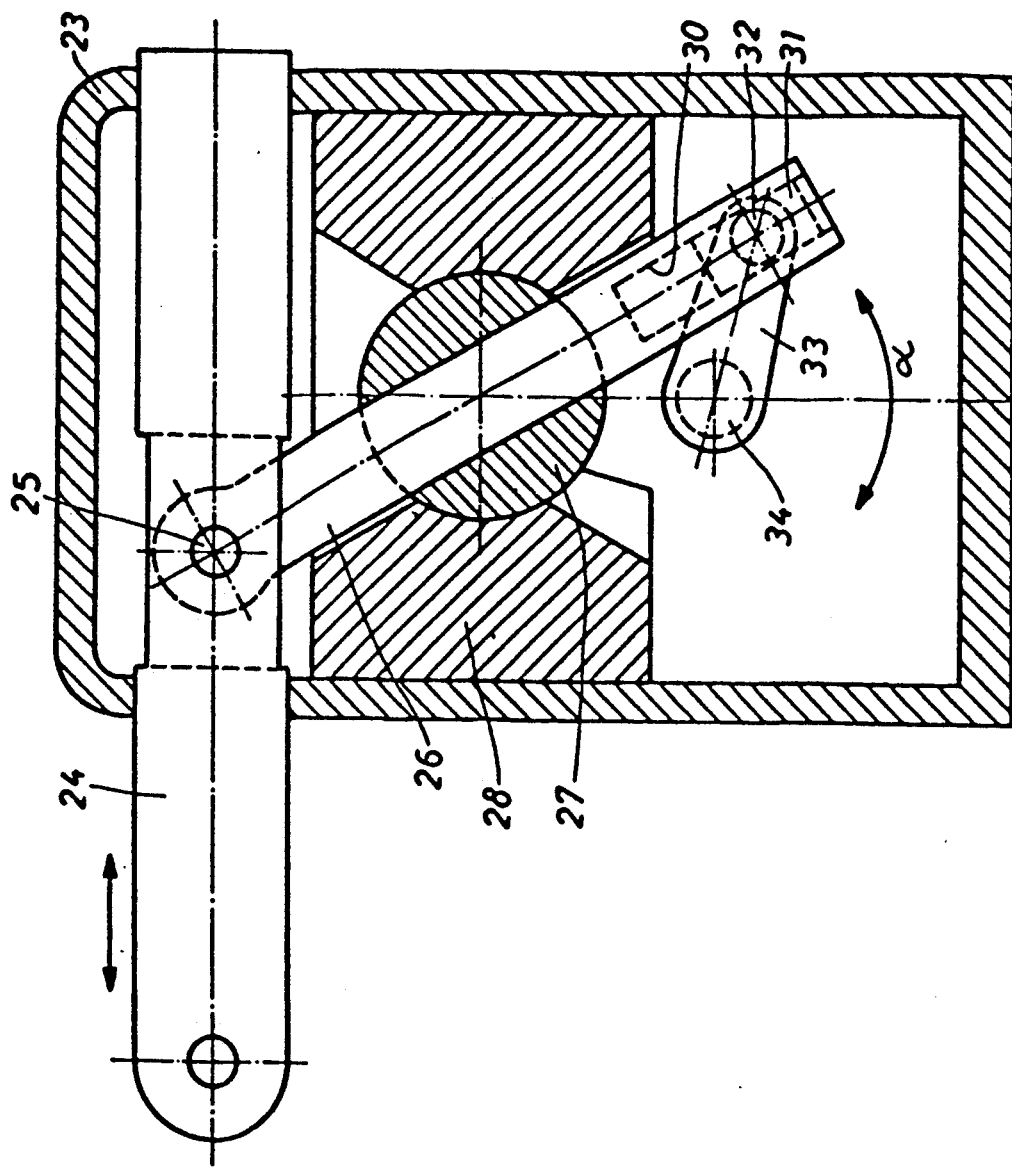
FIGS. 4 and 5 illustrate an apparatus for an oscillating driving of at least one shaft.
Figure 4:
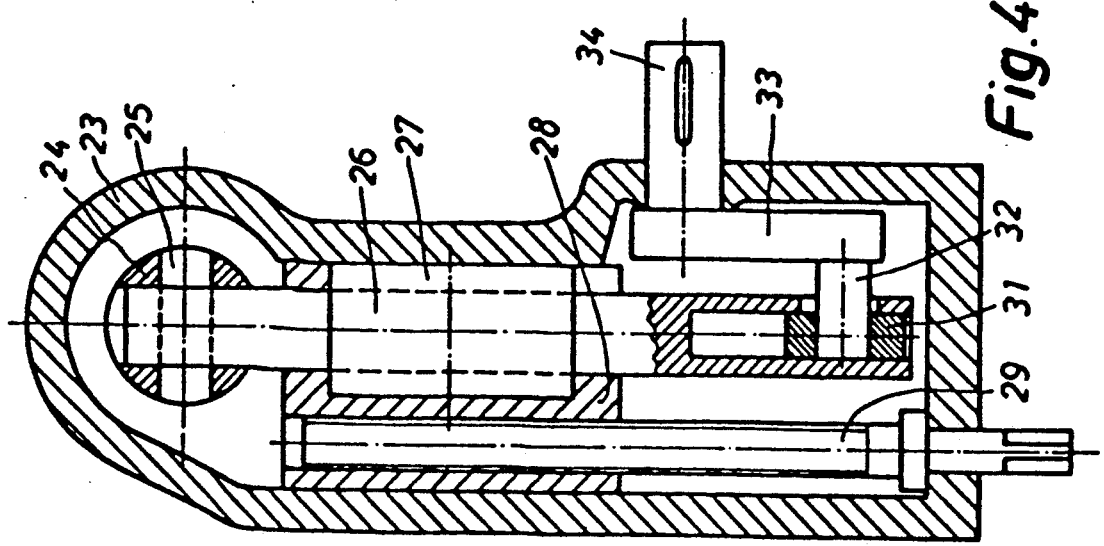

Based on FIGS. 4 and 5 the operation of the drive for an oscillating driving of at least one shaft will now be explained.

A rod 24 supported for longitudinal movement in a casing 23 is reciprocally moved, for instance, by means of a crank drive, which rod 24 drives a lever 26 which is pivotably mounted thereto via a pivot pin 25. This lever 26 is guided in a drum shaped guide member 27, which is supported in a bearing pedestal 28 having an inner thread. The bearing pedestal 28 is prevented from rotating within the casing 23 and a threaded spindle 29 extends therethrough. When the threaded spindle 29 is rotated, the bearing pedestal 28 shifts its location together with the guide member 27 such that the location of the center of rotation of this lever 26 can be adjusted or changed, respectively.

The lever 26 is designed as a hollow profile having gliding surfaces 30 located therewithin, in which gliding surfaces 30 a slide ring 31 is supported. The pivot 32 of a crank 33 extends through the slide ring 31. The crank 33 is connected to the oscillatingly driven shaft 34.

If now the rod 24 is reciprocated translatorically, the lever 26 is rotated reciprocatingly, whereby the axis of the drum shaped guide member 27 is the axis of rotation of this movement. The pivoting movement of the end of the lever 26 is transmitted via the slide ring 31 and the pivot 32 supported therein via the crank 33 onto the shaft 34 to be driven such that now this shaft 34 is oscillatingly driven.

If the threaded spindle 29 is rotated, the axis of rotation of the lever 26 can be adjusted, such that accordingly the magnitude of the deflection of the end of the lever 26 which supports the slide ring 31 can be adjusted and accordingly the amplitude of the oscillating movement of the shaft 34 can be adjusted.

It is, thereby, of decisive importance, that the translatory movement of the longitudinally movable supported rod 24 and the movement of the pivot pin 25 are always the same independently of mentioned deflection of the lever 26 and that the pivot pin 25 will always be in the same end positions, in which it reverses the direction of movement.

The drum shaped guide member 27 is inserted rotatably in the bearing pedestal 28 such that the geometric center of the drum shaped guide member 27 is located on the center axis of the lever 26. By means of this design and because the slide ring 31 is translatorically movable supported in the lever 26, the lever 26 is not subjected to torsional loadings, but rather only to bending loadings, such that a much smaller inner flexibility or yielding effect, respectively, of the apparatus is achieved. Furthermore, it is now also possible to design the casing 23 rather narrow such that a saving on space is arrived at.

Figure 3:
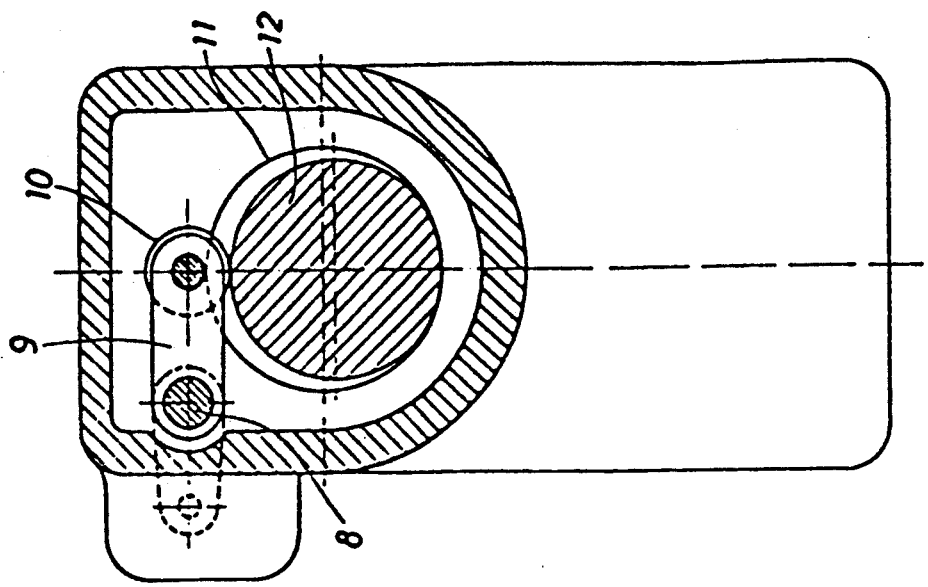
FIG. 3 is a section along line II—II of FIG. 1.
Figure 2:
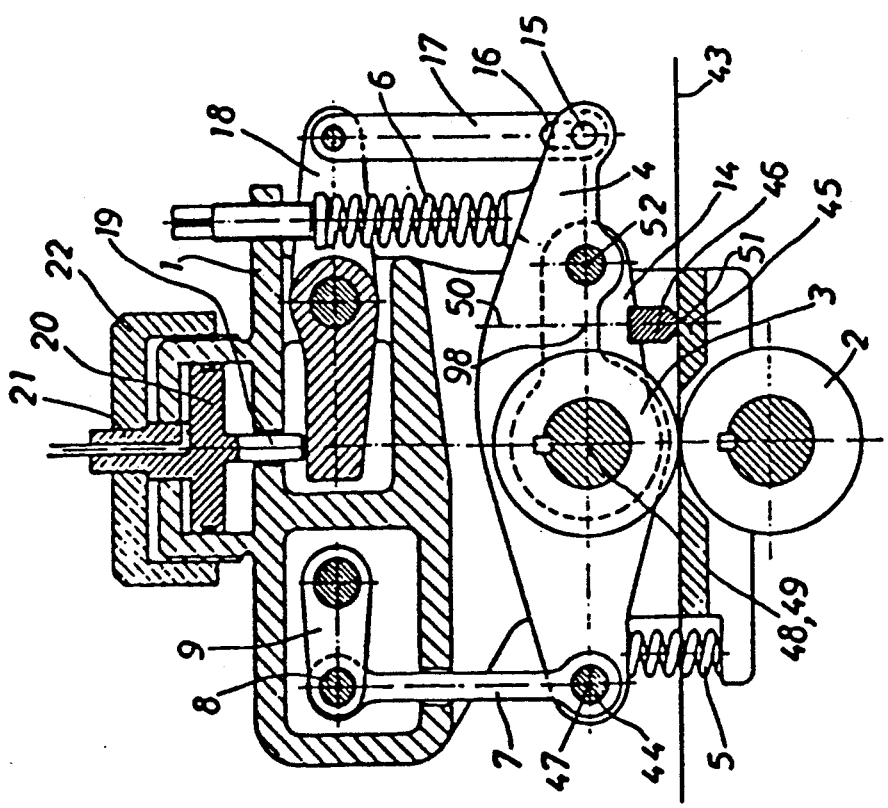
FIG. 2 is a section along line I—I of FIG. 1.

Based on the FIGS. 1-3 it now will be described how the principle of the driving as explained above is applied for the driving of the exemplary two feeding rollers 2 and 3. The drive shaft 11 supports at one of its ends a gear wheel 35, which meshes with a drive gear wheel 36 of a not particularly designed main drive. A gear wheel 37 is eccentrically supported in the drive shaft 11. This gear wheel 37 rolls along a gear ring 38 having an inner toothing which is inserted in the casing 1. The gear wheel 37 is rigidly connected to a disk 39, which supports an eccentrically located pivot pin 25, which pin is illustrated in FIG. 1 as well as also in FIGS. 4-6. This pivot pin 25 is mounted to the lever 26, in which above mentioned slide ring 31 is located and in which the pivot 32 of the crank 33 is received, via which crank 33 the shaft 34 which is to be driven is driven oscillatingly. By means of the threaded spindle 29 the bearing pedestal 28, in which the drum shaped guide member 27 is supported, is screwed upwards or downwards, depending on the amplitude having been selected. The crank 33 includes a toothed segment 40, which meshes with a toothed segment of a disk or rocker arm 41, respectively. Via a suitable clutch 42 the oscillating movement of mentioned disk or rocker arm 41, respectively, is transmitted to the upper feeding roller 3.

By above structure the two feeding rollers 2 and 3 are oscillatingly driven in a contrarotating fashion.

The intermittent stepwise feeding of a workpiece, for instance, of a sheet metal web 43, which is located between the two feeding rollers 2 and 3, will now be described in detail. As already mentioned above, the drive shaft 11 includes a cam member 12 which in this embodiment is an integral part of the drive shaft 11. When the drive shaft 11 rotates, the roller 10 moves in an oscillating manner, which movement is transmitted via the lever 9, to the shaft 8 located at the side thereof onto the rod 7 which is now oscillated accordingly. The rod 7 is pivotably mounted via the pin 47 to the rocker 4.

If now the rod 7 is moved downwards, it urges the rocker 4 against the force of the spring downwards. Due to the force exerted by the rod 7 onto the end of the rocker 4 supported on the spring 5 the rocker 4 is pivoted downwards around the pin 15 towards the sheet metal web 43. The upper feeding roller 3 is thereby pressed against the lower stationary supported feeding roller 2. The rod 7 continues to move downwards and due to this further movement the bite between the feeding rollers 2 and 3 becomes now the center of rotation of the rocker 4 such that conclusively the pressing bar 46 is lifted off. The rod 7 continues its downward movement such that the rocker 4 is now rotated or pivoted, respectively, around the mentioned center of rotation such that now the pin 15 is translatorically moved in the oblong hole 16. The two feeding rollers 2 and 3, which rotate during this period in the direction of workpiece feed, contact the sheet metal web 43 and advance the web (in the illustration of FIG. 2 towards the left hand side). Now the rod 7 begins to move upwards. The springs 5 and 6 cause thus a pivoting of the rocker 4 around the axis of the feeding roller 3, such that accordingly the pressing bar 46 is lowered again and clamps the sheet metal web 43 against an abutment 45 such that the web is arrested. After the clamping of the sheet metal web 43 the upper feeding roller 3 is lifted off. Accordingly the two feeding rollers 2 and 3 do no longer act onto the sheet metal web 43 and make during the rotating of the drive shaft 11 a movement opposite to the direction of feed.

Due to the illustrated structure it is no longer necessary to effect at the rocker any special measures for coping with various thicknesses of a respective sheet metal web 43 being fed.

The extent or distance, specifically of the feeding steps, is adjusted by an adjusting of the amplitude of the oscillating movement of the feeding rollers, i.e. such as mentioned above, by a translatory moving of the bearing pedestal 28 along the threaded spindle 29.

In order to initially insert the sheet metal web 43 to be fed the piston 20 is lowered and accordingly the rocker 4 raised via the supporting member 17. Accordingly, the pin 44 defines now the pivotal point of the rocker 4 such that the feeding roller 3 is lifted off. Because obviously the pressing bar 46 is lifted off, too, because the arms 13, 14 pivot around their pivotal point at the casing 1, the sheet metal web 43 can be freely inserted. The adjusting nut 22, which determines via the pin 21 the base position of the piston 20, is used for the adjusting of the height position of the supporting member 17, i.e. specifically of the oblong hole 16 thereof. It has been mentioned that during a pivoting of the rocker 4 the pin 15 moves in the oblong hole 16. If during the upwards moving of the rod 7 initially the roller 3 and thereafter the pressing bar 46 are lifted off the sheet metal web 43, the web lies completely free during a short time span, such that the arresting or locking, respectively, pins which, as is generally known, belong to the respective tool of a punching apparatus can center the sheet metal web 43 for the punching proper. Accordingly, the time span for the centering of the sheet metal web 43 by means of the locking pins may be adjusted by means of operating the adjusting nut 22.

Figure 6:
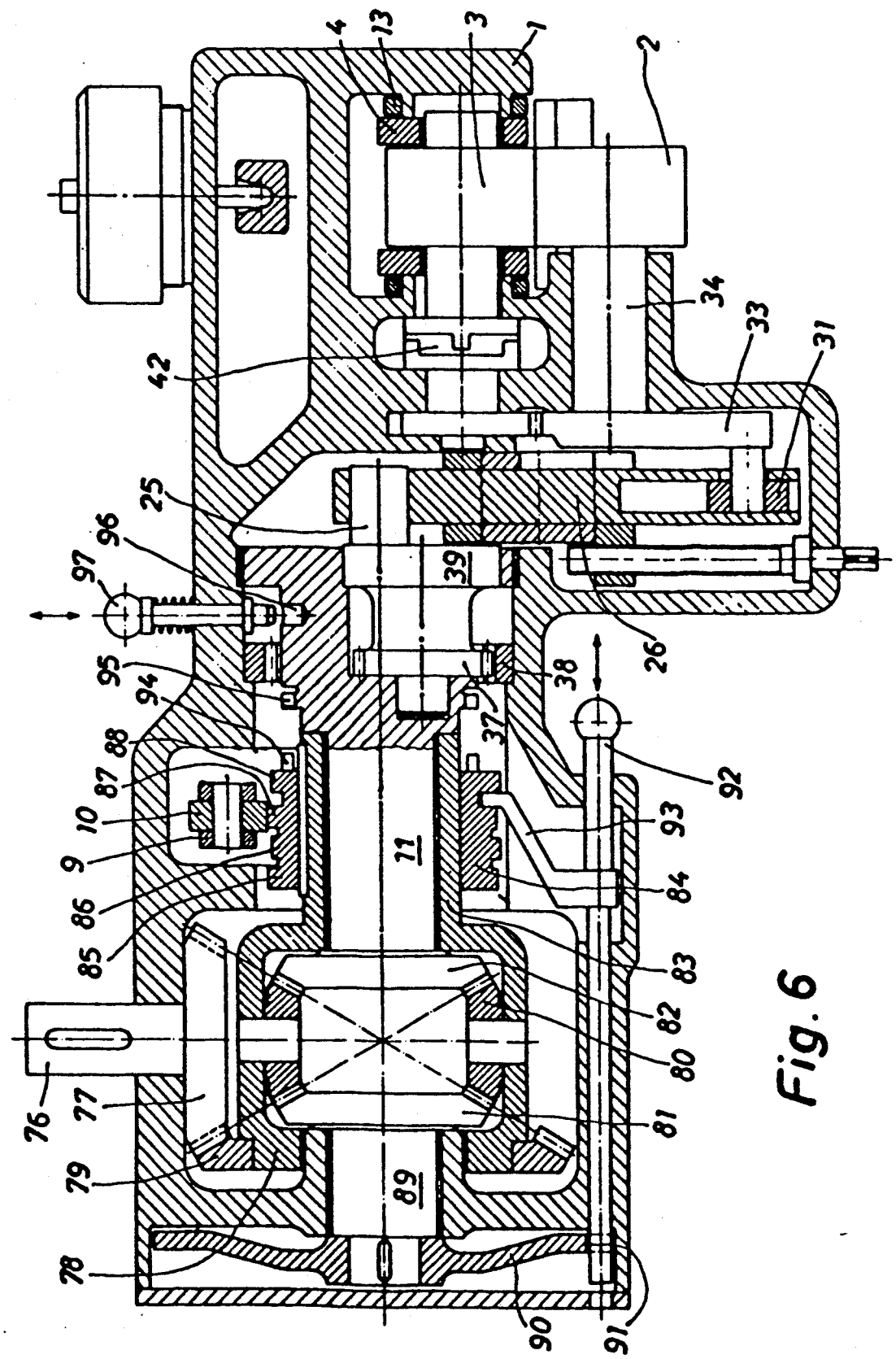
FIG. 6 illustrates an apparatus for a controlling or shifting, respectively, of the stroke of the feeding.

FIG. 6 illustrates now an apparatus for controlling or setting, respectively, of the feed, which apparatus is a preferred embodiment of the invention. It shall be noted that the general structure and design of this embodiment has been disclosed in the description of FIG. 1 such that a repetition of the corresponding description is not necessary.

The drive of the apparatus proceeds from a not specifically illustrated driving source via the drive shaft 76. The driving gear 77 is seated on this drive shaft 76. The driving gear 77 meshes with the web 78 of a planetary gear, to which end the web 78 includes a toothed rim 79. The web 78 supports, furthermore, planet pinions 80. These planet pinions 80 mesh on the one hand with an arrestable sun wheel 81, which will be described in detail further below. On the other hand these planet pinions 80 mesh with an output sun wheel 82, which is mounted for rotation onto the drive shaft 11 which has been described in detail above in connection with the description of FIG. 1. The drive shaft 11 is rotatably supported in an axially extending sleeve section 83 which is an integral part or section, respectively, of the web 78 of the planetary gear. The gear wheel 37 which also already has been described above is eccentrically supported in the drive shaft 11, which gear wheel 37 meshes with the gear rim 38 having an inner toothing and which gear wheel 37 is mounted further to the disk 39 supporting the pivot pin 25. The pivot pin 25 acts onto the oscillating lever 26 having the slide ring 31, which finally acts via the crank 33 onto the shaft 34 to be driven and finally the feeding rollers 2 and 3.

A shifting sleeve 84 is mounted on the sleeve section 83 to rotate therewith but to be axially displaceable thereupon. This shifting sleeve 84 supports a plurality of control disks having an operative function which corresponds to that of the cam member 12 of FIG. 1. These control disks control the movement of a roller 10 resting at one respective end of each control disk, which roller 10 is coupled via the arm 9 to the link rod 7 for moving the rocker 4.

The arrestable sun wheel 81, which meshes with the planet pinions 80, is coupled via a stub shaft 89 to an arresting disk 90, which includes at least one arresting notch 91 located at its circumference.

A control slide bar 92 is displaceably supported in the casing 1, which control slide bar 92 has a front end section which can be moved into and out of, respectively, the arresting notch 91. This control slide bar 92 includes furthermore a dog 93, which extends into an interstice between the control disks 87 and 88. Accordingly, the shifting sleeve 84 can be displaced back and forth on the sleeve section 83 by operating the control slide bar 92 such to select one of the control disks 85-88, onto to which the previously mentioned roller shall rest.

The shifting sleeve 84 includes, furthermore, axially projecting clutch members 94, which can be moved to engage clutch members 95 arranged on drive shaft 11. The section of the drive shaft 11, which forms the eccentric member or the eccentric, respectively, has a recess 96 and an arresting member 97 which is displaceably supported in the casing 1 can be inserted into this recess 96.

The operation of this controlling apparatus will now be described, based on FIG. 6 and the description proceeds from the position of the various structural members as designed in FIG. 6. The driving gear 77 is rotated by the rotating drive shaft 76, which driving gear 77 drives in turn via the toothed rim 79 the web 78 of the planetary gear. When the control slide bar 92 is in the position as illustrated, its front end section projects into the arresting notch 91 such that accordingly the arresting disk 90 and the arrestable sun wheel 81 are in their arrested or locked, respectively, position.

Accordingly, the web 78 rotates around the arrested or locked, respectively, sun wheel 81 such that the planet pinions 80 rotate along the arrested sun wheel 81. Conclusively, these rotating planet pinions 80 rotate the output sun wheel 82, which output sun wheel 82 rotates in turn correspondingly the drive shaft 11 such that due to the above described structural members of the apparatus finally the feeding rollers 2 and 3 are moved oscillatingly. Due to the roller 10 resting on the control disk 87 the rocker and correspondingly the upwards and downwards movements of the feeding roller 3 are timed such that the sequence of operating steps is followed, which has been explained based on FIGS. 1-3.

If the control slide bar 92 has been displaced to its outermost right hand position (based on the illustration of the Figure), it releases the arresting disk 90 and accordingly the arrestable sun wheel 81. In this position of the control slide bar 92, however, the clutch members 94 of the shifting sleeve 84 engage the clutch members 95 of the drive shaft 11.

The drive shaft 76 rotates and accordingly the driving gear 77 rotates, too, but now the planet pinions 80 do no longer roll along the released, i.e. not arrested, sun wheel 81, which obviously can rotate freely. The rotational movement of the web 78 is transmitted directly via the sleeve section 83 and the shifting sleeve 84 coupled to rotate therewith and via the clutch members 94, 95 in turn directly to the drive shaft 11. In this position, furthermore, the roller 10 rests on the control disk 85 located at the outermost left position. This control disk 85 is structured in this embodiment such that the upper feeding roller 3 rests on the sheet metal web 43 to be fed during a span of 180° of the rotational movement of the drive shaft. Accordingly, a direct drive transmitting is present.

If the control slide bar 92 is moved towards the left hand side by one control disk "step", its front end engages and thus locks the arresting disk 90 of the arrestable sun wheel 81 and in this state the roller 10 rolls on the control disk 86. On the one hand now, due to the arrested or locked, respectively, sun wheel 81, a different transmission ratio, e.g. 1:2 between the drive shaft 76 and the drive shaft 11 is arrived at and on the other hand the control disk 86 can now be shaped such that the feeding rollers contact the respective sheet metal web 43 to be fed only during 90° of one complete revolution and, for instance, symmetrically relative to the phase in an exemplary punching movement of a punching press.

If the control slide bar 92 is displaced one further step towards the left, such that the roller 10 rests on the control disk 87, which state is illustrated in FIG. 6, the arrestable sun wheel 81 remains arrested and now it is, for instance, possible that the feeding rollers 2 and 3 contact the web 43 during 90° prior to the upper dead center of the punching movement At the outermost position of the displacement of the control slide bar 92 the roller 10 rests on the control disk 88, whereby here, for instance, a contacting of the web 43 can prevail during 90° after the upper dead center of the punching movement.

It shall also be noted, that if the control slide bar 92 is in a position or state, respectively, according to which the clutch members 94 and 95 are in engagement, a transmission ratio between shaft 76 and shaft 11 of 1:1 prevails, and if in the same state the arrestable sun wheel 81 is released, a transmission ratio of 1:2 prevails.

When the arresting member 97 has been displaced into the recess 96 and the arrestable sun wheel 81 has been released by the control slide bar 92, the oscillating position of the lever 26 relative to the rotational position of the driving shaft 76 can be adjusted, if such is desired.

While there is shown and illustrated a present preferred embodiment of the invention, it is to be distinctly understood that the invention is not limited thereto, but may be otherwise variously embodied and practiced within the scope of the following claims.

I claim:

1. An apparatus for controlling the feed of a feeding apparatus for an intermittent feeding of a web-shaped workpiece, comprising a planetary gear having a web including a tooth rim which meshes with a driving gear wheel, which web supports planet pinions which mesh with an arrestable sun wheel and with an output sun wheel seated on a shaft which is rotatably supported in an axial sleeve section of said web and coupled to an eccentric member of a transmitting unit operative to transform a rotational movement of the shaft of the output sun wheel into an oscillating movement for a driving of said feeding apparats, and wherein said apparatus further comprises a plurality of control disks formed on a slidable shifting sleeve arranged rotationally fixed but axially displaceable on said axial sleeve section of the web, which control disks are operative to control the movement of a link member resting via a roller on one respective disk, which link member is part of a pressing unit operative to exert intermittently a pressure force onto a respective workpiece to be advanced.

2. The apparatus of claim 1, in which said arrestable sun wheel is mounted to an arresting disk which is arrestable in the apparatus causing by means of a control slide bar, by means of which simultaneously an axial position of said slidable shifting sleeve including the control disks is selectable.

3. The apparatus of claim 2, in which said slidable shifting sleeve, which is displaceable by said control slide bar, includes clutch members intended to cooperate with corresponding clutch members of said shaft, which control slide bar is arranged such that if said slidable shifting sleeve is coupled to said shaft via the clutch members, the arresting disk is released by the slide bar such that a direct drive connection prevails between said web and said planetary gear.

4. The apparatus of claim 1, comprising further an arresting member displaceably supported in the casting of the apparatus, which arresting member is insertable into said shaft such to lock the shaft to he apparatus casing.

5. An apparatus for controlling the feed of a feeding apparatus for an intermittent feeding of a web-shaped workpiece, comprising a planetary gear having a web including a tooth rim which meshes with a driving gear wheel, which web supports planet pinions which mesh with an arrestable sun wheel and with an output sun wheel seated on a shaft which is rotatably supported in an axial sleeve section of said web and coupled to an eccentric member of a transmitting unit operative to transform a rotational movement of the shaft of the output sun wheel into an oscillating movement for a driving of said feeding apparats, and wherein said arrestable sun wheel is mounted to an arresting disk which is arrestable in the apparatus casing by means of a control slide bar by means of which an axial position of said slidable shifting sleeve is selectable.

* * * * *